United States Patent Office 3,342,703
Patented Sept. 19, 1967

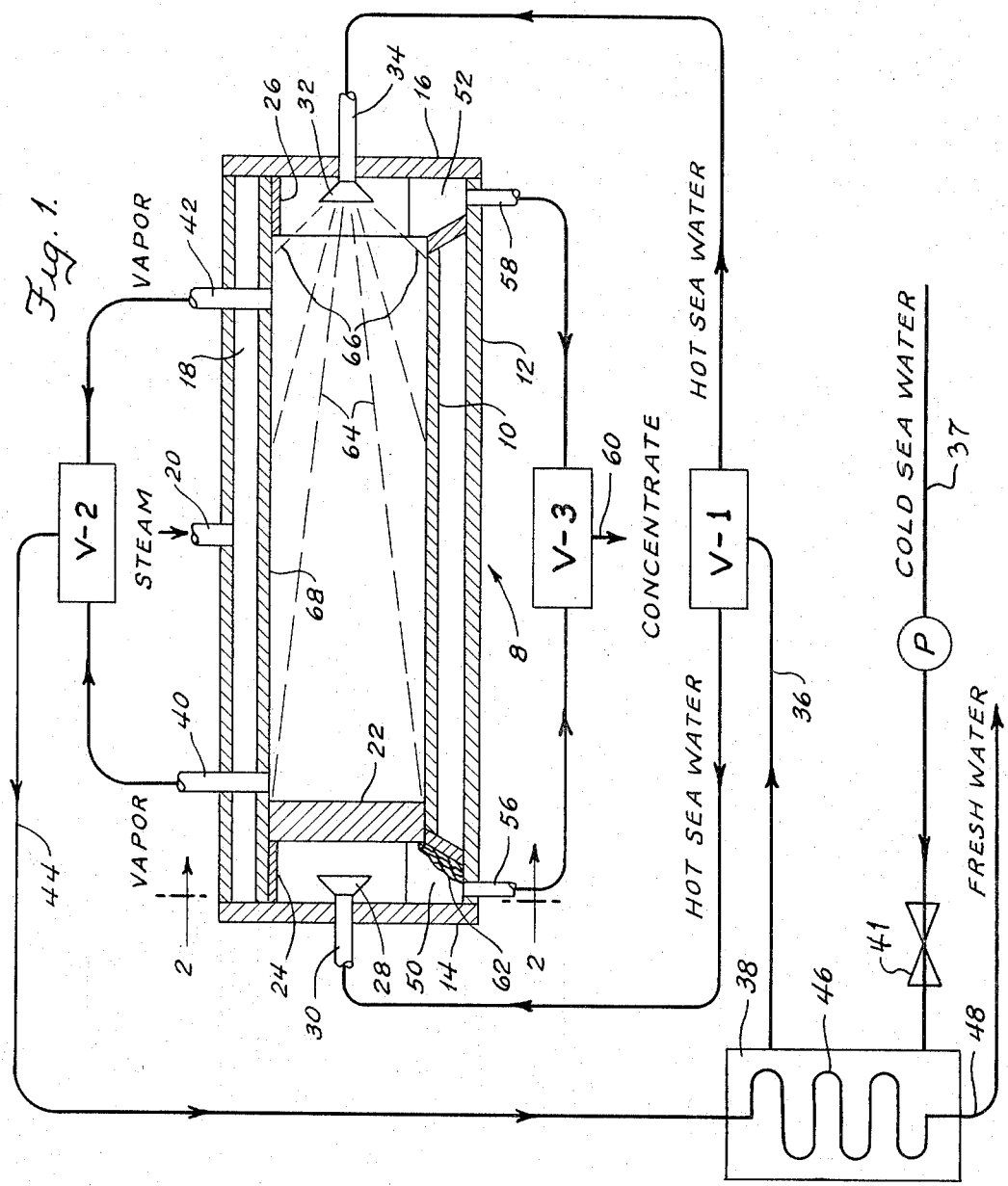

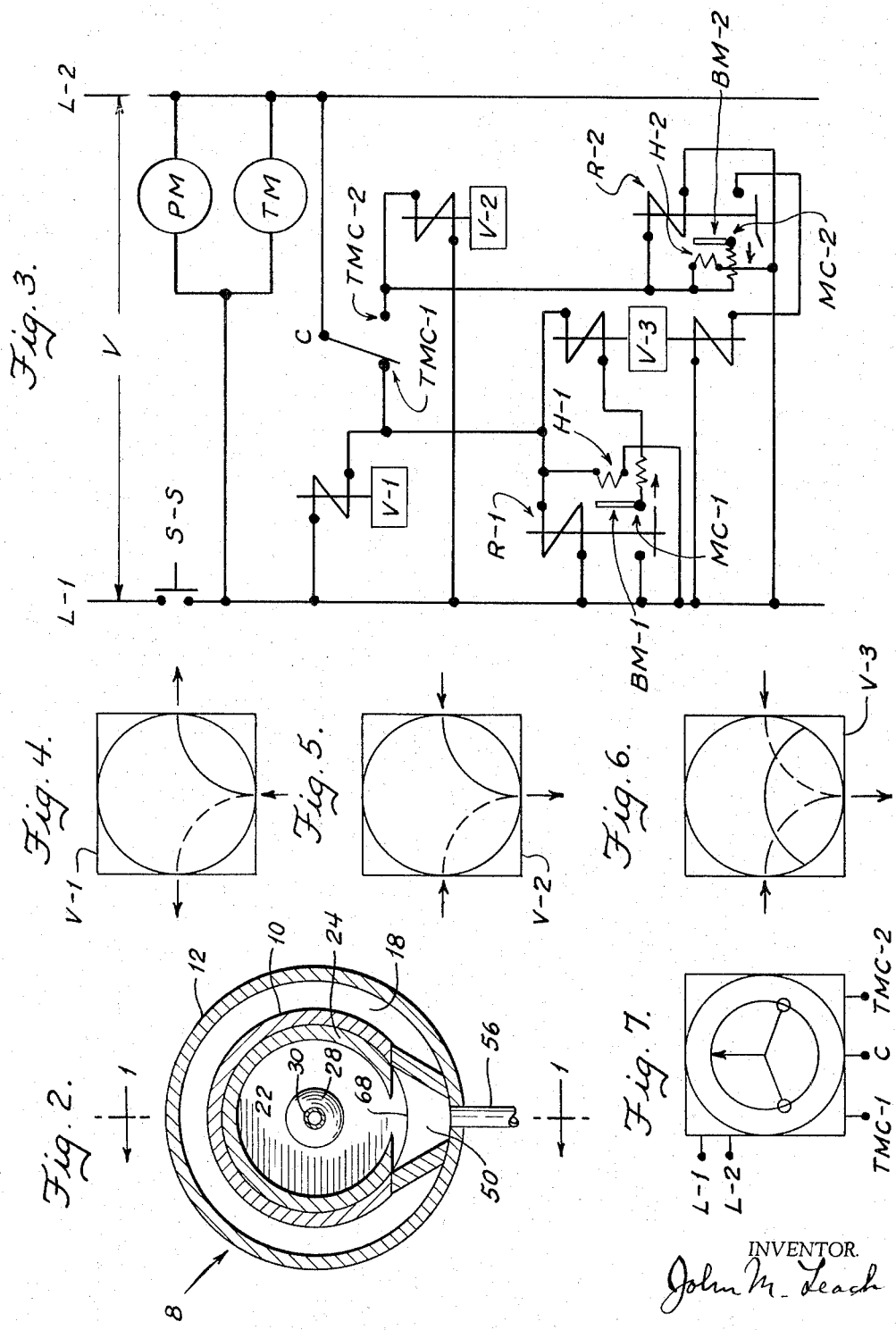

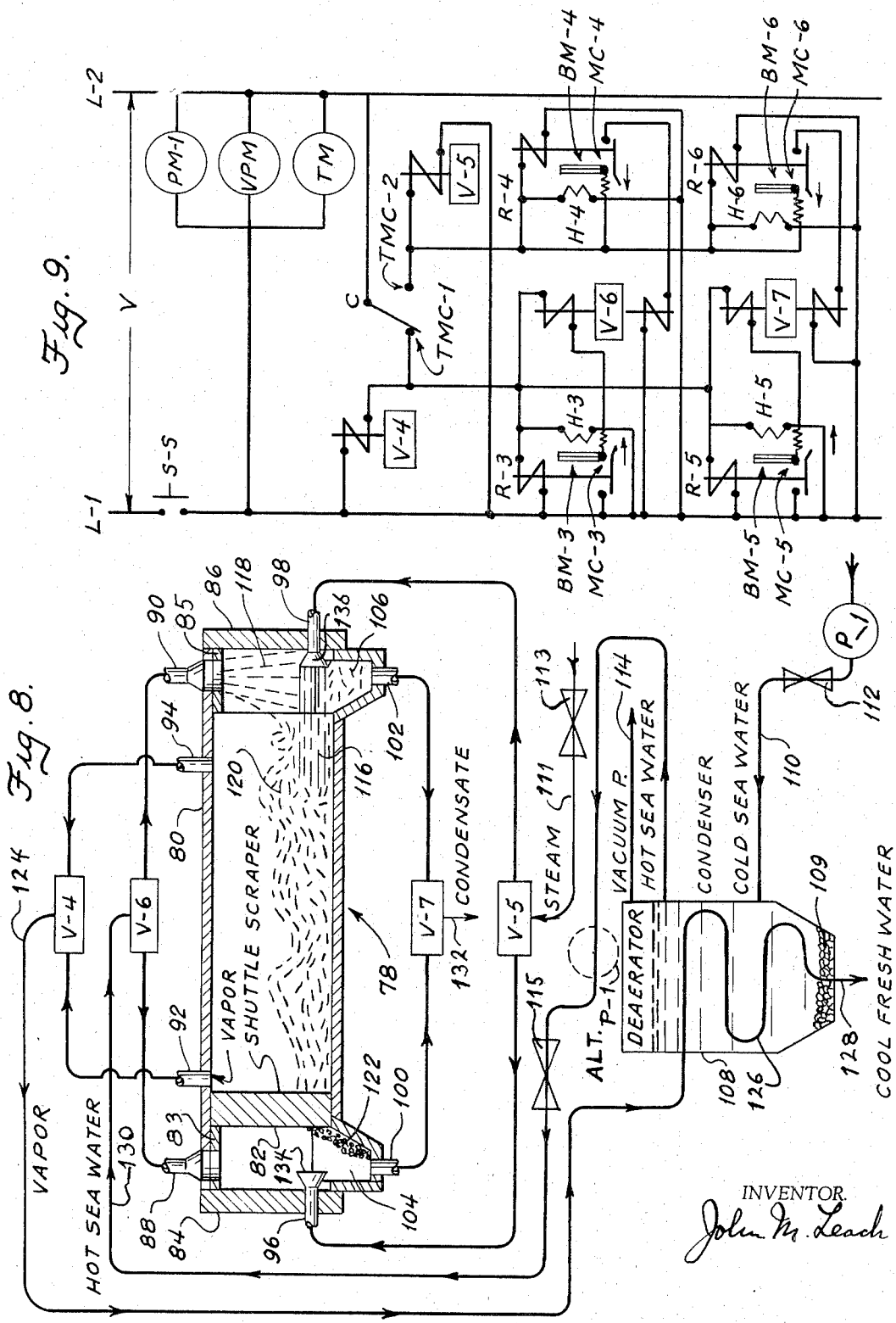

3,342,703
METHOD AND PISTON MEANS FOR REMOVING PRECIPITATE FROM A CLOSED CHAMBER
John M. Leach, P.O. Box 350, Port Jefferson, N.Y. 11777
Filed Nov. 29, 1963, Ser. No. 326,884
2 Claims. (Cl. 203—4)

The present invention relates to substance treating process and apparatus, and, more particularly, to substance treating process and apparatus in which the starting substance is divided into two or more parts which are segregated during the treating operation.

The present invention constitutes a modification of and improvement upon the inventions disclosed in my prior U.S. Patents No. 2,995,450 and No. 2,995,451. All of the advantages enumerated in the specifications of these two prior patents apply with equal force and effect to the present invention insofar as there is common subject matter.

More particularly, the present invention relates to a process and apparatus for treating substances wherein heat is transferred to or from the substance either by contacting the substance with heat exchanging media directly or through a wall or partition or the like for the purpose of dividing the substance into two or more component parts or derivatives thereof and separating the parts.

Although the present invention can be used in the treatment as aforesaid of many different substances, for the purpose of explanation, it will be described in connection with the production of potable or otherwise usable water from sea or brackish water or water from any source containing dissolved and/or suspended substances which render it unfit for human or animal consumption or many industrial and agricultural uses. It is to be understood, however, that any substance which is capable of like treatment is to be considered as included within the scope of the treatment operations of the present invention.

In prior water conversion operations probably the greatest obstacle encountered has been the fouling of the apparatus employed by the scale formed from the substances removed from the water which rapidly clogs passages and coats heat exchange surfaces so as to quickly render them inefficient to the point of being inoperative. Many attempts have been made to control scale formation such as pretreatment of the water with chemicals; seeding the water during treatment with small particles to form deposition surfaces for the scale; ionizing the water during treatment; using semi-permeable membranes; forming hydrates which are subsequently decomposed, and operating at relatively low temperatures at which scale is not formed.

All of these attempts thus far have been prohibitively expensive, time consuming, not applicable to general situations, or conducive to yields too low to enable them to be considered practical.

The use of scrapers or wipers to remove scale from surfaces of the apparatus has not been looked upon with favor heretofore because known scraping facilities were costly; undependable in operation; insufficiently effective, and introduced insurmountable space problems. Also, effective facilities for segregating the scale from the water were not available.

The present invention may be summarized as a process and apparatus in which the maximum removal of scale forming and other components from the water in induced in a given area, the matter so removed is collected on an adjacent surface, the collected matter is periodically and automatically wiped or scraped from the surface mechanically and concentrated at a given point, and the concentrated collected matter is periodically and automatically removed from all association with the water from which it was removed.

It is an object of the present invention to provide a process and apparatus capable of removing precipitable substances from a liquid, for example, from water having such substances dissolved therein and/or suspended thereby.

It is another object of the present invention to provide a process and apparatus capable of removing precipitable substances from sea, brackish and other hard waters without adding any extraneous materials to the water.

It is another object of the present invention to provide a process and apparatus capable of rendering hard water fit for human and animal consumption as well as for industrial uses at elevated temperatures, and which is capable of operation for long periods without interruption and without close personnel supervision.

It is a further object of the present invention to provide a process and apparatus for removing precipitatable substances from hard waters by the use of evaporation induced by heat and controlling and segregating the scale from the converted water without the addition of any extraneous substances over and above the heating medium.

It is still another object of the present invention to provide a process and apparatus for removing precipitatable substances from water by the use of a mechanical scraper or wiper which is low in cost, simple in construction, and requires a minimum of space.

It is a further object of the present invention to provide an apparatus for removing precipitable substances from hard waters which involves a mechanical scraper or wiper which has the combined function of separating the precipitated substances from a surface and concentrating these substance in a removal area.

It is a still further object of the present invention to provide a process and apparatus for removing undesirable substances from water at a high rate, with a minimum of equipment, and at a low cost per unit of volume.

Other objects and advantages of the present invention will become apparent to those skilled in the art from the description of the invention in the following specification.

For a more detailed description of the invention, reference is made to the following specification taken in connection with the accompanying drawings, throughout which like reference characters refer to like parts and in which:

FIG. 1 is a diagrammatic view of one form of apparatus of the present invention including a central longitudinal cross sectional view of the precipitating unit, taken on line 1—1 of FIG. 2;

FIG. 2 is a cross sectional view of the precipitating unit of the present invention taken on line 2—2 of FIG. 1;

FIG. 3 is a diagrammatic view of one form of electrical circuit which can be employed for the controls of the present invention;

FIGS. 4, 5 and 6 are diagrammatic views showing the energized and de-energized positions of valves V-1, V-2 and V-3, respectively;

FIG. 7 is a front view of a type of electrical timer which can be used as a master control for the equipment of the present invention;

FIG. 8 is a diagrammatic view of another form of apparatus of the present invention including a central longitudinal cross sectional view of another form of precipitating unit of the present invention, and FIG. 9 is a diagrammatic view of another form of electrical circuit which can be employed for the controls of the present invention.

The precipitating unit of the present invention shown in FIG. 1 is designated generally at 8 and comprises a chamber which is preferably but not necessarily cylindrical in shape and formed by the cylinder 10 having an interior wall surface 68. A cylinder 12 surrounds cylinder 10 leaving a space 18 therebetween. Heads 14 and 16 suitably connected to the ends of cylinders 10 and 12 by any desired means (not shown) complete the enclosed chamber of the precipitating unit.

A piston 22 is positioned within the cylinder 10 and fitted to slide freely along the cylinder surface 68 so as to scrape or wipe it free of any materials existing thereon. A stop 24 which is preferably in the shape of a partial circle is positioned within cylinder 10 at one end and an identical stop 26 is so positioned at the other end. These stops 24 and 26 limit movement of the piston 22 as shown at the left in FIG. 1. Thus the piston provides a movable end wall for the precipitating chamber.

A depression or sink is formed at each end of the cylinder 10 as shown at 50 and 52. Pipes 40 and 42 are positioned so as to each communicate at one end with the chamber formed by the interior of cylinder 10 and each connect at its opposite end with a solenoid valve V–2. Pipes 30 and 34 are suitably fastened through the caps 14 and 16 and are connected at the interior of the chamber to spray heads 28 and 32, respectively. Pipes 56 and 58 are suitably fastened through the cylinder 12 and terminate within the sinks 50 and 52, respectively, each at one end and each connects at its opposite end with a solenoid valve V–3. The opposite ends of the pipes 30 and 34 from the spray heads are connected to the solenoid valve V–1. A pipe 20 communicates at one end with the space 18 between the cylinders 10 and 12 and is connected at its opposite end with any desired source of steam. The space 18 thus forms a steam jacket around the cylinder 10 and the chamber within. Any desired and well known type of condensate removal means, such as a conventional steam trap (not shown), is connected at any suitable point near the bottom of cylinder 12 to keep the steam jacket free of condensate. Any desired well known type of manual or automatic steam flow regulator and thermal control (not shown) can be used to regulate the flow of steam to the jacket 18 so as to maintain the surface 68 at any desired predetermined temperature during operation of the precipitating unit.

A pump P of any preferred type but usually of the impeller type receives relatively cold water to be treated from a pipe 37 which is connected to any desired source of such water. This water will be referred to hereinafter as raw water and is to be understood as covering sea water, brackish water from any source, naturally and artificially contaminated water, and any other water of any and all types and sources which contains any substance which can be removed therefrom either entirely or in part by subjecting the water to temperature change treatments.

Pump P directs the raw water through a valve 41 to the heat exchange area of a condenser 38 which may be any well known type of condenser but is preferably of the reverse flow helical coil type as shown having a helix pipe 46. The raw water is conveyed from the condenser 38 by pipe 36 to the solenoid valve V–1.

The valve 41 may be either a manually controlled valve or a throttling valve of any well known type automatically controlled by a thermal regulator control of any well known type which is actuated by the temperature of surface 68 of the precipitating chamber, by means of thermocouples or the like in contact with the surface 68. These conventional elements have been omitted from the drawings in order to more clearly illustrate the novel features of the combination of the present invention.

A pipe 44 connects the solenoid valve V–2 with the top of the condenser helix pipe 46 and a pipe 48 connects the bottom of the helix pipe 46 with any desired receiver for the fresh water.

The valves V–1, V–2 and V–3 are controlled by a master electrical Timer shown in FIG. 7 by means of suitable electrical circuitry shown in its now preferred form in FIG. 3. The Timer is preferably of the repeating cycle type usually driven by a synchronous motor and capable of being set by knob or arm and dial adjusters to provide any period of time cycle desired. Such timers are standard articles of commerce.

The solenoid valve V–1 is of the single coil, two position type and, as shown in FIG. 4, has the position shown in solid line when the coil is de-energized and the position shown in dotted line when the coil is energized. V–2 is identical with V–1 as shown in FIG. 5 and has been shown in inverted position in FIG. 1 merely for drafting convenience.

Solenoid valve V–3 is of the two coil, three position type with the de-energized position shown in solid line in FIG. 6, at which position no flow occurs through the valve, and with the position when one of the coils is energized shown in dotted line to the right and the position when the other of the two coils is energized shown in dotted line to the left. All of these solenoid valves are standard items of commerce.

During operation of the precipitating unit 8, raw water entering the precipitating chamber formed within the cylinder 10 by means of one of the spray heads 28 or 32 contacts the piston or movable wall 22 which at the initiation of any operation cycle is preferably in the position shown in FIG. 1, having been left in this position by discontinuing a prior operation when the piston 22 was so positioned. The pressure of the water and the vapor pressure created by the water contacting the hot surfaces on the interior of the precipitation chamber move the piston along the interior of the cylinder 10 until it contacts the stop 24 or 26 at the opposite end of the cylinder 10. As the finely divided streams of water from a spray head strike the heated surface 68 it is vaporized and all non-volatile substances are left as a scale deposit. The vapor is discharged through one of the pipes 40 or 42 and as the piston 22 moves along over the surface 68 all deposits upon this surface are wiped or scraped ahead of the piston 22 and predominantly deposited in one of the sinks 50 or 52 when the piston is stopped by one of the stops 24 or 26.

For the purpose of explanation, conditions existing within the precipitation chamber at a point prior to cessation of an operation are shown in FIG. 1. At such time, spray water is issuing from the spray head 32 and impinging upon the heated surface 68. The openings in the spray head are preferably positioned so that the spray pattern is predominantly confined in the area between the lines 64 and 66 so that all of the heated evaporating surface 68 is covered and most of the spray is confined to contact with this surface 68. The vaporized water leaves all of its non-volatile dissolved and suspended substances on this surface as a scale. The piston 22 during its movement along the surface 68 at the beginning of the existing cycle wiped and scraped off all of the scale deposit then existing upon the surface 68 and deposited it in a mass in the sink 50 as shown at 62. Some scale adhered around the periphery of the piston 22 on the face adjacent to the spray head 28 which has been inactive during this cycle. At some point prior to the normal termination of this particular cycle the operation was terminated by pushing the stop button of the start-stop switch S—S shown in FIG. 3. This caused all of the elements to be in the respective positions shown in FIGS. 1 and 3 but with all water spray discontinued.

An operating cycle is the time which elapses between the beginning of the ejection of water from one spray head until ejection of water from that spray head is discontinued and ejection of water from the other spray head is immediately started. This time is selected as later described and the Timer, FIG. 7, is set so that it will end one cycle and initiate another repeatedly until de-energized by adjusting the position of the stops or hands on the dial to the cycle time desired. This time may be any desired from a fraction of a second to several months depending on the rating of the timer being used.

The desired time cycle having been selected and the Timer dial set accordingly, the water conversion operation is started by pushing the start button of the start-stop switch in the circuit shown in FIG. 3. This completes a circuit from the left hand side of the diagram as shown in FIG. 1 from the power supply lead L–1 across to the pump motor PM and the Timer motor T*m* to the power supply L–2. This starts the pump and the time cycle starts to run on the Timer. The Timer Motor Contact TMC–1, being normally closed, remains closed so that a circuit is completed from L–1 to the coil of solenoid valve V–1, TMC–1, the common Timer contact C to L–2. This causes the coil of V–1 to be energized so that the valve assumes a position so as to establish communication between the raw water pipe 36 and the pipe 30 leading to the spray head 28 as shown in FIGS. 1 and 4. All supply of water is shut off from pipe 34 at this time. Solenoid valve V–2 is not energized at this time because Timer Motor Contact TMC–2 is not closed as shown in FIG. 3. This means that the position of Valve V–2 is as shown in solid line in FIG. 5 so that communication is between pipe 44 and pipe 42 and no communication between pipe 44 and pipe 40 exists at this time.

A circuit is established from L–1, through the coil of Relay R–1, to TMC–1, to C and to L–2. This energizes relay R–1 so that a holding circuit is established from L–1, through the closed contacts of R–1, to the top coil of solenoid valve V–3, to TMC–1, to C and to L–2. This energizes V–3 so that it assumes the position shown in dotted line to the left in FIG. 6 and establishes communication between pipe 56 and pipe 60. No communication between pipe 60 and pipe 58 exists at this time.

As the water spray issues from spray head 28, it first strikes the adjacent face of piston 22 and dislodges and washes off all scale particles clinging to the piston which were scraped loose from surface 68 during the last movement of the piston along the cylinder 10. The water then flows or is flushed rapidly down into the sink 50 and floods the mass of scale 62 out of the sink 50 and out through the pipe 56 and valve V–3 to the concentrate disposal pipe 60 where it is lead to any desired disposal facility. This washing and flushing action takes only a short time, depending on the size of the scale mass 62, so that valve V–3 must be closed as soon as possible to avoid loss of water and time.

To accomplish this closing of V–3, one of the contacts of Relay R–1 is mounted on the free end of a bi-metallic element which is suitably mounted in a fixed position at its opposite end, all as designated BM–1 in FIG. 3. A moving contact MC–1 is thus provided. The bi-metallic element BM–1 is selected in known manner so as to flex whenever a given amount of heat is applied to it for a given time and a heater H–1 is positioned adjacent to BM–1 as shown in FIG. 3. H–1, being connected in parallel with the coil of R–1 is energized concurrently and coextensively with R–1. The time which it takes heater H–1 to cause BM–1 to flex is selected so as to equal the time which it is desired for V–3 to remain open. At the end of this time interval, BM–1 flexes and moves MC–1 so as to break its contact with the relay armature and thus break the circuit to the top coil of V–3. This causes V–3 to reassume its de-energized position as shown in solid line in FIG. 6 and thus shut off all flow through V–3 so that no more water can flow out of the then clean sink 50.

The pressure built up by the water issuing from spray head 28 plus the vapor pressure caused by the water contacting the hot piston 22 causes the piston to move towards the right as viewed in FIG. 1. As the piston moves it exposes more of the surface 68 progressively to contact by the water spray and more pressure is built up to keep the piston moving until it passes to the right of the opening of pipe 42 and contacts the stop 26 where it remains throughout the remainder of the cycle. As soon as pipe 42 is exposed vapor starts to flow through pipe 42 to valve V–2 to pipe 44 to the helix pipe coil 46 in condenser 38 where it is condensed back to water by transferring its latent heat to the relatively cold raw water surrounding the helix 46 in the condenser 38. From coil 46 the fresh water is carried by pipe 48 to suitable storage or a point of use.

As the piston moved over the surface 68 it effectively wiped or scraped all of the deposited precipitated substances from the surface 68 and concentrated the removed matter in the sink 52.

The length of the time cycle is selected so that the cycle will end and a new cycle start at such time as to clean the surface 68 while the scale thereon is relatively soft and before it gets hard enough to require any substantial force to be exerted by the piston 22 in order to remove it. This is not because of the inability of the piston to exert sufficient force because the steam pressure will build up behind piston 22 to any amount required to remove the scale, regardless of how hard it might get, but wear between the piston and surface is reduced almost to nothing when the scale is soft and can be gently wiped off by the piston 22 with practically no force required. In many instances the soft scale actually provides considerable lubricity. Also, there is little gained by operating with long cycle periods because only a minor quantity of water is lost when the scale is flushed out of the sinks 50 and 52 and no time is lost during cycle changes because the change from one spray head to the other is almost instantaneous and vapor is generated during the entire time that the piston is moving over the surface 68. Furthermore, the automatic control of the steam flow to jacket space 18 to maintain surface 68 at a selected temperature with reasonable tolerances plus and minus and the automatic control of the rate of flow of the raw water through throttling valve 41 in accordance with any variation in the temperature of surface 68, that is, the flow rate is increased within limits when the temperature of surface 68 increases and the flow is decreased when the temperature of surface drops, prevents the operating balance from being seriously affected by cycle changes.

All during the time that the piston 22 is at rest during a cycle period, spray will be evaporated by contact with surface 68 and intermingling with the vapor circulating through the cylinder 10 towards whichever vapor removal pipe is open which during the cycle presently being described is the pipe 42 as above explained.

At the same time that vaporization of the water is taking place, scale is being deposited upon the surface 68 and the rate of scale build up and the effect which it has upon the transfer of heat through the wall of cylinder 10 will depend predominantly upon the type of substances in the raw water, the concentration of the substances and the temperature differential between the raw water and the surface 68. The length of the time cycle will, therefore, preferably be determined empirically for each area and installation of the equipment of the present invention. Since the operation of the present invention, in contrast to prior processes, calls for evaporation of the raw water as fast as possible and deposition of all precipitatable substances as fast as possible, the differential between the raw water temperature regardless of the amount of preheating and the temperature of surface 68 will be made such as to produce as rapid evaporation as possible within an economical range which will depend on the source of the heating media.

It will be understood that the raw water can be preheated, in addition to the heat transferred to it by condenser 38, by any other desired heat source, such, for example, as flue gases, engine exhaust gases, waste steam from power plants, hot water tailings from power and other plants, etc. The steam used in jacket space 18 can, of course, be obtained from or created by heat from the same types of sources.

In general, it is desirable that the raw water be heated to a point approaching labile supersaturation so that no precipitation will occur prior to contact with surface 68 and the operating temperature of surface 68 be maintained so that the raw water spray flashes into vapor almost instantly upon contact with the surface 68. It is not necessary, however, that such instantaneous evaporation be effected if a slower rate of evaporation should for any reason be preferred because some build up of raw water in the cylinder 10 is entirely permissible. Any such build up of water will be evaporated and the vapor discharged through whichever of the pipes 40 and 42 the piston 22 is moving towards during movement of the piston just following a cycle change. Also, if desired, a time limiting relay exactly the same as R-4 to be later described can be inserted in the circuit for V-1 exactly in the way it is used in the circuit shown in FIG. 9 for V-6 for the purpose of discontinuing the flow of raw water from either spray head 28 or 32 at a sufficient time prior to the end of a cycle to evaporate all raw water accumulated in the cylinder 10 prior to the termination of a cycle.

It can thus be seen that the process and apparatus of the present invention provide unusual flexibility and latitude of operation to accommodate almost any given set of conditions encountered during a raw water converting operation.

When the Timer reaches the end of the cycle period presently being described it trips the single pole double throw switch shown in FIG. 3 so as to shift contact from TMC-1 to TMC-2 and immediately and automatically starts a new cycle. This switching contact from TMC-1 to TMC-2 and vice versa will continue at each cycle change until the stop button of the start-stop switch S—S is pushed.

As soon as contact is broken with TMC-1, which it will be understood occurs only at a cycle change, V-1, R-1 and H-1 are all de-energized, which causes V-1 to move to its de-energized position shown in solid line in FIG. 4. This cuts off all flow of water from the spray head 28 and places pipe 36 in communication with pipe 34 and raw water starts to issue from spray head 32. It will be noted that piston 22 is now in contact with the stop 26 having been moved into this position during the preceding cycle and during such movement it wiped scale from surface 68 and concentrated the scale mass in sink 52.

As soon as contact is made with TMC-2, a circuit is completed from L-1 through the coil of solenoid valve V-2 to TMC-2 to C to L-2 and V-2 is thus energized and moves to the dotted line position shown in FIG. 5 wherein communication between pipes 44 and 42 is discontinued and communication between pipe 44 and pipe 40 is established so as to direct vapor from pipe 40 to condenser helix pipe 46 where it is condensed to fresh water and directed to pipe 48.

A circuit is also established from L-1 to the coil of Relay R-2 to TMC-2 to C to L-2 which energizes R-2 to close its contactors which establishes a circuit from L-1 to the bottom coil of solenoid valve V-3 to TMC-2 to C to L-2. This energizes V-3 and causes it to assume the position shown in FIG. 6 so as to establish communication between pipes 58 and 60 and permits water from spray head 32 to flush scale concentrate from the face of piston 22 and sink 52 through pipe 58, V-3 and pipe 60 to the concentrate disposal area. Pipe 56 remains closed as shown in FIG. 6.

A circuit is also established from L-1 to heater H-2 to TMC-2 to C to L-2 which energizes the heater so as to heat the bi-metallic contact supporting element BM-2. As soon as the time for which the heater H-2 and BM-2 are adjusted for expires, the bi-metallic element BM-2 moves movable contact MC-2 of the R-2 contactor as shown by the arrow so as to break contact at MC-2 and open the circuit for the coil of solenoid valve V-3 and thus cause V-3 to assume the position shown in solid line in FIG. 6 and thus cut off all flow through V-3.

The water and vapor pressure then causes piston 22 start moving to the left as viewed in FIG. 1 and this movement continues until piston 22 contacts the stop 24 where it remains until the completion of the present cycle during which time the water from spray head 32 is continuously evaporated and its precipitatable contents deposited upon the surface 68.

Upon the completion of the present cycle, the Timer will cause the single pole double throw switch to break contact with TMC-2 and again make contact with TMC-1 and thus repeat the cycle functions described above until the stop button of switch S—S is pushed.

It will be understood that other heating media besides steam can be supplied to the space 18 within the scope of the present invention. Also, when treating any material where precipitation is produced by a lowering of the temperature of the material, any desired coolant can be supplied to the space 18 within the purview of the present invention.

A modification of the present invention is shown in FIGS. 8 and 9 in which the precipitation unit 78 comprises a cylinder 80 suitably provided with heads or caps 84 and 86, sinks 104 and 106 and a movable piston 82 and piston stops 83 and 85 all as in the preceding modification.

The precipitation unit 78 is also provided with vapor removal pipes 88 and 90 which connect with a solenoid valve V-4 which has a connected pipe 124 which directs vapor to helix pipe coil 126 in condenser 108 and then to fresh water outlet pipe 128; with water inlet pipes 88 and 90 having spray heads and connected to a solenoid valve V-6 which connects with a pipe 130 which receives hot raw water from the condenser 108 through throttling valve 115, and with condensate receiver pipes 100 and 102 from sinks 104 and 106, respectively, and which connect with a solenoid valve V-7 which is connected to a condensate disposal pipe 132, as in the preceding modification. The solenoid valve V-4 is identical with V-1 and solenoid valves V-6 and V-7 are identical with V-3 in both construction and function.

It will be noted, however, that the raw water spray heads are in a different position in this modification from the position shown in the preceding modification for a later described reason. Also, there is no steam jacket surrounding the cylinder 80 and the steam is directed into the interior of the cylinder 80 by pipes 96 and 98 provided spray heads 134 and 136, respectively.

The steam supply pipes 96 and 98 are connected to a solenoid valve V-5 which is connected to a steam supply pipe 111 provided with a throttling valve 113 of well known type. The solenoid valve V-5 is identical in construction and function with V-1.

The raw water is supplied from any desired source by a pump P-1 and directed through a throttling valve 112 to the condenser 108. The condenser is preferably provided with a settling area for the collection of solids which settle out of the raw water and can be suitably removed at intervals as well as a space at the top which serves as a deaerator which is preferably connected to a vacuum pump by the pipe 114. This same arrangement can also be used with the formerly described modification if desired and the settling basin, condenser tank and deaerator can be formed as separate units if such is desired.

The raw water supplied to the precipitator unit in this modification is also preferably heated to a point approaching labile supersaturation of its contained substances so that the water spray heads are preferably located as far as possible away from the steam spray heads so as to avoid premature heating of the raw water which could cause premature precipitation of substances within the heads and possibly cause fouling of the spray heads. The spray heads for the steam are also preferably located so that the water spray is directed into the steam spray to cause rapid exchange of heat between the water and steam and so that the steam will be projected directly into the body of water 120 within the cylinder 80 as shown at 116.

The electrical control circuitry, shown in FIG. 9, which is preferably used in this modification very closely parallels the circuitry of the formerly described modification and the same type of Timer is used as shown in FIG. 7.

Here again, for the purpose of exploration, conditions existing within the precipitation unit 78 during a cycle are shown in FIG. 8. The switch S—S is in closed position at this time which causes a circuit to be made to energize the motor PM-1 for the pump P-1, the motor VPM for the vacuum pump and the motor TM for the Timer.

At the initiation of the present cycle by the Timer, the single pole double throw switch was actuated by the Timer so as to move from TMC-2 to TMC-1. The piston 82 was in contact with the stop 85 at the right hand end of cylinder 80 as viewed in FIG. 8. A circuit was completed from L-1 through the coil of solenoid valve V-4 to TMC-1 to C to L-2 which energized V-4 and caused it to assume a position to place pipe 92 in communication with pipe 124 so that vapor was thus directed to the helix pipe coil 126 of the condenser 108 where the vapor is condensed while giving up its latent heat to the raw water in the condenser and the fresh water is directed by pipe 128 to storage or a using operation.

V-5 is not energized at this time so that this valve is in position to place pipes 111 and 98 in communication so that steam is supplied to steam spray head 98 and project the steam along the path 116 predominantly. Pipe 96 is closed at this time as is also pipe 94.

At the initiation of this present cycle, a circuit was completed from L-1 to the coil of relay R-3 to TMC-1 to C to L-2. This actuated the relay R-3 to move its armature so as to close its contactors and complete a circuit from L-1 through the contactors of relay R-3 through the upper coil valve of V-6 to TMC-1 to C to L-2 which moved solenoid valve V-6 so as to establish communication between pipes 90 and 130 and cause hot raw water to be sprayed into cylinder 80 as shown at 118 which flushed all scale particles clinging to piston 22 down into sink 106 which also contained some concentrated scale mass at this time.

A circuit was also completed from L-1 to the coil of relay R-5 to TMC-1 to C to L-2 which energized relay R-5 and closed its contactors so as to complete a circuit from L-1 through the contactors of R-5 through the upper coil of solenoid valve V-7 which energized V-7 and moved it into position to establish communication between pipe 102 and condensate disposal pipe 132. This enabled the spray water jet 118 to flush all of the scale concentrate in sink 106 away and thoroughly clean the sink.

At the same time a circuit was completed from L-1 to heater H-5 to TMC-1 to C to L-2 which caused the heater to heat the bi-metallic element BM-5 which carries the movable contact MC-5 of the relay R-5. As soon as the heater caused the element BM-5 to reach the heat for which BM-5 and H-5 are adjusted so as to provide the desired time period, BM-5 moved contact MC-5 in the direction shown by the arrow and broke the circuit to the upper coil of solenoid valve V-7 and caused V-7 to move to its de-energized position and thus discontinue all flow through V-7.

The water and steam pressure then moved the piston 82 to the left, which wiped all scale deposit from the interior of cylinder 80, until the piston contacted stop 83 at which time it deposited the scale mass 122 in the sink 104. All during the time the piston 82 was moving steam was mixing with incoming raw water and evaporating it which deposited more scale on the interior of cylinder 80. As soon as piston 82 moved to the left of the opening of pipe 92 vapor started passing from the cylinder 80 and ultimately to condenser 108 and then delivered as fresh water as above described. This action will continue until the end of the present cycle, because steam 116 will continue to evaporate raw water and cause scale depositing throughout the cycle.

The length of a time cycle for this modification of the present invention will again preferably be determined empirically as in the former modification in accordance with the same existing factors as explained above.

In order to avoid any possibility of the piston 82 forcing residual water in the cylinder 80 out through the pipe 94 during the early phase of the next succeeding cycle, a heater H-3 is provided adjacent to the bi-metallic element BM-3 which movably supports contact MC-3 of the relay R-3. A circuit exists from L-1 through heater H-3 to TMC-1 to C to L-2. H-3 and BM-3 are adjusted to cause BM-3 to be heated so as to move MC-3 at a selected point in the cycle and break the circuit through the top coil of solenoid valve V-6 and move the valve to its de-energized position where no flow of water occurs through this valve and the water spray from pipe 90 will be discontinued.

This point in the cycle where the water spray will be discontinued is selected so there will be sufficient time remaining in the cycle for the steam 116 to evaporate all of the residual water in the cylinder 80 and thus preclude any under treated or unevaporated water from being forced by the piston 82 into the vapor pipe 94 during the early phase of the next succeeding cycle.

When the timer reaches the end of the present cycle, it will move the single pole double throw switch from the TMC-1 to the TMC-2 position which will de-energize V-4, R-3 and R-5. This will cause V-4 to move to the position to place pipes 94 and 124 in communication so as to direct vapor from cylinder 80 through pipes 94 and 124 and ultimately to the fresh water outlet as above described.

A circuit will be made from L-1 through the coil of solenoid valve V-5 to TMC-2 to C to L-2 and thus energize V-5 so as to direct steam to spray head 134.

A circuit will be made from L-1 through the coil of relay R-4 to TMC-2 to C to L-2 and actuate R-4 to complete a circuit from L-1 through the bottom coil of solenoid valve V-6 to the contactors of R-4 to TMC-2 to C to L-2 and cause valve V-6 to move to an energized position to direct raw water to spray head 88.

A circuit will be made from L-1 through the coil of relay R-6 to TMC-2 to C to L-2 and energize R-6 and move its contactors so as to complete a circuit from L-1 through the bottom coil of solenoid valve V-7 to the contactors of R-6 to TMC-2 to C to L-2 and so energize V-7 to move it into a position to place sink 104 in communication with the condensate disposal pipe 132 and thus enable the water spray to flush all of the scale from the face of piston 82 and the scale mass 122 from the sink 104 to the concentrate disposal pipe 132.

After a selected preset period the heater H-6, bi-metallic element BM-6 and movable contact MC-6 will function in the same manner as explained above for H-5, etc., to de-energize the lower coil of solenoid valve V-7 so as to discontinue all flow through it which will cause the water and steam pressure to move piston 82 to the right as viewed in FIG. 8 and the cycle will follow an identical pattern to that described above including discontinuing the water flow from spray head at a predetermined time prior to the end of the cycle by means of heater H-4, bi-metallic element BM-4 and MC-4 so as to de-energize V-6 and cause it to move to the all-closed position and thus permit the steam jet from spray head 134 to evaporate all of the residual water in cylinder 80 before the cycle ends so as to prevent any water from being forced into vapor pipe 92 during the early phase of the next succeeding cycle.

The above described cycles will repeat indefinitely until the stop button of switch S—S is pushed, as described above in connection with the preceding modification of the invention.

It will be understood that the individual devices shown in FIG. 3 and FIG. 9, each within itself, from no part of the present invention and are standard items of commerce. Also, many other devices exist which can be substituted individually in the electrical circuits without departing from the scope of the present invention. For example, individual Timers of several different types can be substituted for the Relays R–1 to 6 if desired which would be more costly but would offer the advantage of more rapid delay time period adjustments if frequent adjustments of such periods should become advantageous.

One of the advantages of the apparatus of the present invention is the use of standard and readily available inexpensive elements throughout with the exception of the precipitation units 8 and 78. This causes both original procurement and maintenance to be inexpensive and time saving because the standard elements can be procured in most instances in a matter of hours and the low cost makes it practical to carry standby items which can be used to immediately and quickly replace any element which fails in service.

The precipitation units 8 and 78 are relatively simple in structure, inexpensive to fabricate, require a minimum of maintenance, unusually efficient, and dependable in operation.

It can be seen that the process and apparatus of the present invention provide new, useful and usually effective facilities for the conversion of raw waters at a high rate of yield, at a low cost, and without any limitation on the yield in order to avoid the adverse effects of scale formation as has been the case with all prior water conversion operations.

The present invention also provides a unique flexibility in operation so as to accommodate substantially all types of requirements for water conversion. That is, the apparatus can be made in small capacity sizes where relatively low fresh water production is required and space limitations exist such as aboard ships and in individual residences or small industrial or agricultural operations. The apparatus can be made, on the other hand, in very large sizes where high fresh water production is required. Also, a battery including an indefinite number of precipitation units of either the type of 8 or 78 can be operated in parallel relationship and all controlled by the same electrical controls if desired, which would appreciably decrease plant costs for large yield operations.

The process and apparatus of the present invention also are capable of application to almost any set of conditions existing at points where water conversion operations are desired. For example, where high potency heat sources, such as high pressure steam, are available, the apparatus will be adjusted, for example by adjustment of the throttling valves 113 and 112, etc., so that a relatively large quantity of water is directed to the precipitating unit in proportion to the quantity of steam utilized for evaporation of the water. On the other hand, where a low potency heat source, such as low pressure steam tailings or the like, is what is available, suitable adjustments would be made so as to direct a relatively small quantity of water to the precipitation unit for evaporation in proportion to the quantity of steam employed. In either event, the scale formation would be completely controlled so as to secure the maximum efficiency from either type of operation without the addition of any extraneous substances.

It is to be understood that many changes and modifications can be made in the specific disclosure and examples described above without departing from the scope of the present invention and no undue limitations are to be imposed upon the scope of the invention because of this disclosure of the now preferred forms of the invention and that the present invention is to be defined by the following claims.

I claim:

1. The process of removing undesired substances from a material which substances precipitate upon change in temperature of the vehicular material comprising directing the material into a closed chamber alternately on opposite sides of a movable partition wall within the chamber, changing the temperature of the material within the chamber to precipitate the material onto a surface on the interior of the chamber, utilizing the pressure of the material entering the chamber to move the movable wall in wiping relation to the surface to remove the precipitate therefrom and deposit the concentrated precipitate in a removal area completely isolated from the precipitation surface and said area being provided with an exit from the chamber, introducing a controlled quantity of the material to remove the concentrated precipitate from the removal area and out of the chamber through the exit, and separately removing the precipitate-free material from the chamber.

2. Apparatus for removing undesired heat precipitatable substances from a vaporizable material comprising a closed chamber to receive the material, a piston movable within said chamber in wiping contact with an interior precipitate receiving surface thereof between extreme positions, means for applying heat to said chamber to vaporize the material and precipitate the substances onto said surface, a precipitate receiving area on the opposite side of said piston from said surface when said piston is in one of the said extreme positions and said area being provided with an exit within said chamber, means for injecting the material into said chamber alternately on opposite sides of said piston to move it along said precipitate receiving surface to wipe precipitate therefrom until it reaches the end of its movable path at which time it deposits the precipitate in said receiving area, precipitate washing means for directing a quantity of material into and through said precipitate receiving area to wash the precipitate out of the chamber through the exit, and means for removing the vaporized material from the chamber and condensing it.

References Cited

UNITED STATES PATENTS

| | | | |
|---|---|---|---|
| 2,862,548 | 12/1958 | Yost. | |
| 2,971,897 | 2/1961 | Chapman. | |
| 2,995,450 | 8/1961 | Leach | 99—134 |
| 2,995,451 | 8/1961 | Leach | 99—134 |
| 3,026,261 | 3/1962 | Mayfield et al. | 203—10 |
| 3,163,587 | 12/1964 | Champe | 203—10 |
| 3,245,460 | 4/1966 | Loebel | 203—4 |

NORMAN YUDKOFF, *Primary Examiner.*

WILBUR L. BASCOMB, JR., *Examiner.*